(12) United States Patent
Kreiner et al.

(10) Patent No.: US 7,284,046 B1
(45) Date of Patent: Oct. 16, 2007

(54) COORDINATION OF COMMUNICATION WITH DEVICES

(75) Inventors: Barrett M. Kreiner, Norcross, GA (US); Donna K Hodges, Cumming, GA (US); Jonathan M. Peterson, Atlanta, GA (US)

(73) Assignee: AT & T BLS Intellectual Property, Inc.

( * ) Notice: Subject to any disclaimer, the term of this patent is extended or adjusted under 35 U.S.C. 154(b) by 829 days.

(21) Appl. No.: 10/235,461

(22) Filed: Sep. 4, 2002

(51) Int. Cl.
*G06F 15/173* (2006.01)

(52) U.S. Cl. .................. 709/223; 709/203; 709/246; 455/414.1; 455/414.2; 455/414.3; 455/414.4; 715/733; 715/734; 715/735; 715/736; 715/737

(58) Field of Classification Search ............... 709/223, 709/204–206, 203, 246; 715/733–737
See application file for complete search history.

(56) References Cited

U.S. PATENT DOCUMENTS

| | | | | |
|---|---|---|---|---|
| 5,664,007 A * | 9/1997 | Samadi et al. ............... 455/442 |
| 6,035,339 A * | 3/2000 | Agraharam et al. ......... 709/246 |
| 6,430,624 B1 * | 8/2002 | Jamtgaard et al. .......... 709/246 |
| 6,636,855 B2 * | 10/2003 | Holloway et al. ............. 707/10 |
| 6,687,356 B1 * | 2/2004 | Glitho et al. ........... 379/201.12 |
| 6,741,853 B1 * | 5/2004 | Jiang et al. .................. 455/418 |
| 6,784,899 B1 * | 8/2004 | Barrus et al. ................ 715/717 |
| 6,799,198 B1 * | 9/2004 | Huboi et al. ................. 709/203 |
| 6,961,559 B1 * | 11/2005 | Chow et al. ............. 455/414.1 |
| 6,961,776 B1 * | 11/2005 | Buckingham et al. ...... 709/229 |
| 7,072,984 B1 * | 7/2006 | Polonsky et al. ........... 709/246 |
| 2002/0022453 A1* | 2/2002 | Balog et al. ................... 455/41 |
| 2002/0046299 A1* | 4/2002 | Lefeber et al. ............. 709/318 |
| 2002/0052895 A1* | 5/2002 | Keating ...................... 707/514 |
| 2002/0069243 A1* | 6/2002 | Raverdy et al. ............ 709/203 |
| 2002/0091700 A1* | 7/2002 | Steele et al. ................ 707/100 |
| 2002/0120779 A1* | 8/2002 | Teeple et al. ............... 709/246 |
| 2002/0143856 A1* | 10/2002 | Sastri et al. ................. 709/202 |
| 2002/0199009 A1* | 12/2002 | Wilner et al. ............... 709/231 |
| 2003/0054810 A1* | 3/2003 | Chen et al. .................. 455/422 |
| 2003/0135563 A1* | 7/2003 | Bodin et al. ................. 709/206 |
| 2003/0172173 A1* | 9/2003 | Fenton ........................ 709/231 |
| 2004/0203851 A1* | 10/2004 | Vetro et al. .............. 455/456.1 |

* cited by examiner

*Primary Examiner*—Bunjob Jaroenchonwanit
*Assistant Examiner*—Duyen Doan
(74) *Attorney, Agent, or Firm*—Withers & Keys, LLC (57) ABSTRACT

A system and method is provided for coordinating network communication between multiple communication devices of a user. A communication session is established with an application. A message is received from the application and sent to one of a plurality of communication devices based at least on a status and an output capability of each of the plurality of communication devices.

21 Claims, 7 Drawing Sheets

COORDINATION OF COMMUNICATION WITH DEVICES

FIELD OF THE INVENTION

The invention generally relates to the field of computing. More particularly, the invention relates to systems and methods for coordinating communications between an application and various communication devices.

BACKGROUND OF THE INVENTION

It is not uncommon today for people to use several communication devices. For example, a user may have a home computer, a work laptop, a wireless phone, and a personal digital assistant. Users typically utilize one of these communication devices at a time. For example, a user may send and receive e-mails via their personal digital assistant while commuting to work and then send and receive e-mails via their laptop once arriving at work. To use the personal digital assistant, the user typically begins a session with an e-mail application and the session continues until the user selects to end the session (e.g., at the end of the commute). Upon arriving at work, the user may begin another session between their work laptop and the e-mail application. Such session beginning and ending may be inconvenient for a user.

Each communication device typically has a different set of output capabilities. For example, a laptop computer typically is capable of displaying text and color graphics (e.g., color graphical images and color video). A personal digital assistant typically is capable of displaying text and a wireless telephone is typically capable of displaying a small amount of text and producing audible sounds. Therefore, an e-mail message including a video file may be best sent to a computer rather than being sent to a wireless telephone. Despite the differing output capabilities of the various types of communication devices, present systems and methods do not have the capability to coordinate where to send e-mails and other digital content items. This is typically because one communication device establishes a single session with one application. In such a case, communication is limited to communicating digital content items between that particular device and that particular application.

Moreover, because different types of communication devices may have different output capabilities, applications typically include a significant amount of programming to be able to properly display digital content items on different types of communication devices. For example, an application may include programming code to properly display digital content items on a computer, more programming code to properly display digital content items on a personal digital assistant, and even more programming to properly display digital content items on a wireless phone. Also, applications typically include programming code that queries a communication device to determine its output capabilities. For example, an application may query a browser of a computer to determine its output capabilities before sending a digital content item to the browser. Such programming code may make an application very complex to write and maintain.

In view of the foregoing, there is a need for methods and systems for coordinating communication between several types of communication devices.

SUMMARY

Systems and methods are disclosed for coordinating network communication between multiple communication devices of a user. In a method, a first communication device is determined to have a first output capability regarding displaying or sounding digital content items and a second communication device is determined to have a second output capability regarding displaying or sounding digital content items. The first and second communication devices are determined to be associated with each other. A first digital content item and a second digital content item are received from an application. The first digital content item is determined to be able to be output by the first communication device and that the second digital content is determined to be able to be output by the second communication device. The first digital content item is sent to the first communication device and the second digital content item is sent to the second communication device.

In another method, a first communication device is determined to have a first output capability. A first digital content item is received from an application. The first digital content item is determined to not able to be output by the first communication device. The first digital content item is converted to a second digital content item that is able to be output by the first communication device. The second digital content item is sent to the first communication device.

In another method, a communication session is established with an application. A message is received from the application and sent to one of a plurality of communication devices based at least on a status and an output capability of each of the plurality of communication devices.

A system for coordinating network communication between a plurality of communication devices associated with a user comprising a device manager for each communication device and a device coordination engine that communicates with an application and with the device managers. The device managers are operable to determine a status and an output capability regarding display or sounding capability of the communication devices and to communicate with the corresponding communication devices. The device coordination engine is operable to establish a communication session with the application, to receive a message from the application, and to send the message to one of the communication devices based at least on the status and the output capability of each of the communication devices.

The above-listed features, as well as other features, of the disclosed systems and methods will be more fully set forth hereinafter.

BRIEF DESCRIPTION OF THE DRAWINGS

Illustrative embodiments of systems and methods for device communication coordination are further described in the detailed description that follows, by reference to the noted drawings, in which like reference numerals represent similar parts throughout the drawings, and wherein.

DETAILED DESCRIPTION OF ILLUSTRATIVE EMBODIMENTS

Figure 1:
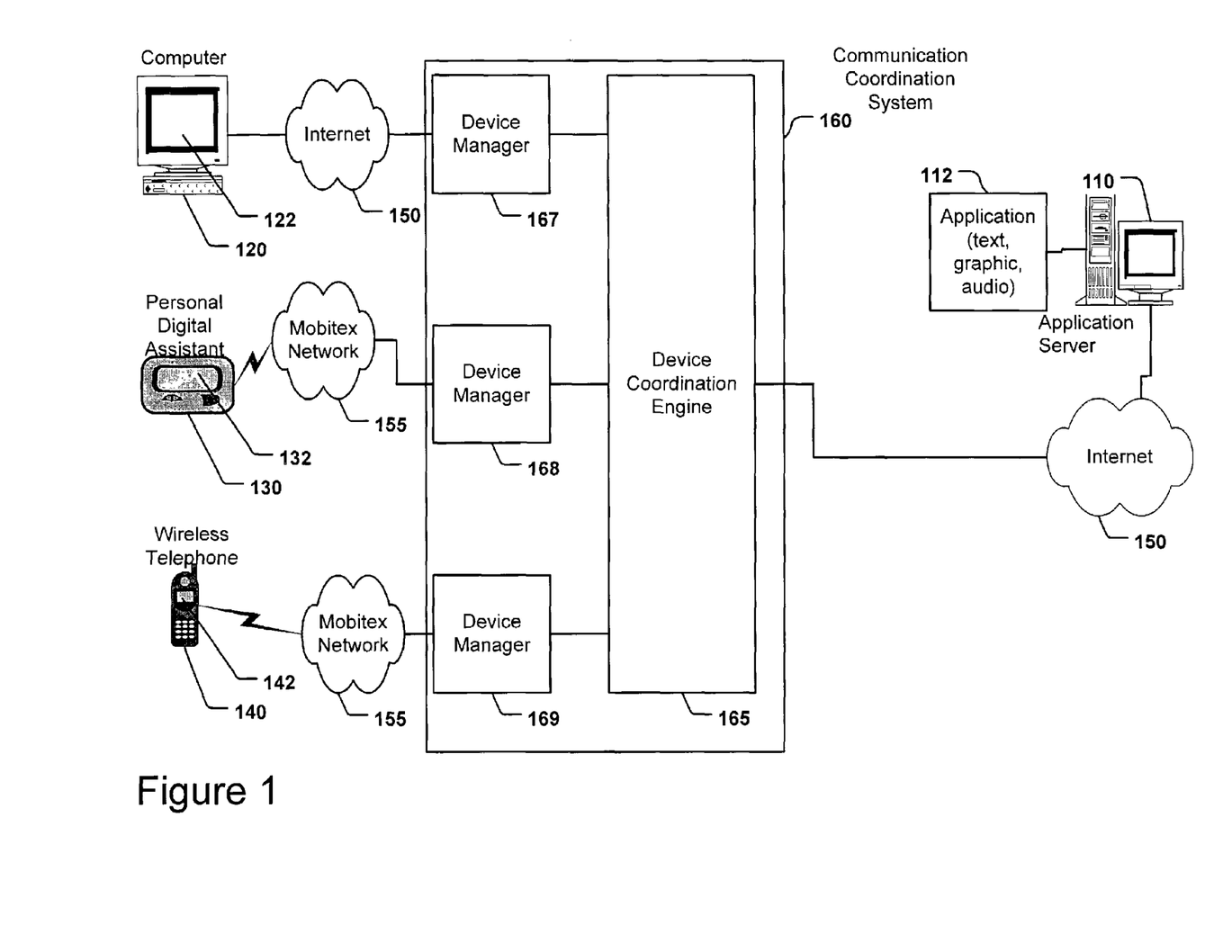
FIG. 1 is a diagram of an exemplary network environment in which coordination of device communication may be implemented and an illustrative system for coordination of device communication.

FIG. 1 shows an exemplary network environment in which coordination of device communication may be implemented. As shown in FIG. 1, application server 110 is in communication with computer 120 via communication network 150. Application server 110 may be any server executing an application that sends digital content items to a communication device. For example, application server 110 may be a web server, an e-mail server, and the like. While communication network 150 is shown as the Internet 150, communication network 150 may be any communication network including a local area network (LAN), wide area network (WAN), intranet, extranet, and the like.

Application server 110 is also in communication with personal digital assistant 130 via communication network 150 and communication network 155. While communication network 155 is shown as a Mobitex network 155, communication network 155 may be any wireless communication network. Application server 110 is further in communication with wireless telephone 140 via communication network 150 and communication network 155.

Computer 120, personal digital assistant 130, and wireless telephone 140 are communication devices that a user may utilize to communicate with application server 110. While a user may utilize any number of communication devices, three communication devices are shown here for illustrative purposes. Communication devices may also include a laptop computer, a wireless pager, a wireless text messaging device, a wireless e-mail device, or any other communication device.

Computer 120 may be any computer (such as, for example, a desktop, a laptop, and the like) that can communicate over a network. As shown, computer 120 may communicate over the Internet 150; however, computer 120 may communicate over any network, such as, for example, a local area network (LAN), a wide area network (WAN), an intranet, and the like. Computer 120 typically executes a browser to communicate with the Internet 150 and to display digital content items received from the Internet 150. The browser may comprise any of several commercially available software browsers including, for example, Microsoft® Internet Explorer browser and Netscape® Navigator broswer. Such browsers are typically configured to communicate via HTTP and to display digital content items based on Hypertext Markup Language (HTML).

HTML is a set of markup symbols or tags inserted in a file intended for display on a browser page. The tags tell the browser how to display a digital content item. Some tags come in pairs that indicate where in a document a particular display format or style is to begin and end. HTML is a formal recommendation by the World Wide Web Consortium (W3C) and is generally adhered to by the major browsers, such as, for example, Microsoft's® Internet Explorer browser and Netscape's® Navigator browser.

Browsers typically are also capable of displaying digital content items based on Extensible Markup Language (XML). XML is also a formal recommendation from the W3C and is similar to HTML. Both XML and HTML contain markup symbols or tags to describe the contents of a page or file. HTML, however, describes the content of a Web page in terms of how it is to be displayed. For example, the letter "p" placed within markup tags starts a new paragraph. XML describes the content in terms of what is being described. For example, the word "phonenum" placed within markup tags could indicate that the digital content item that followed was a phone number. This means that an XML file can be processed by a program based on the tags or can be displayed like an HTML file. XML is "extensible" because, unlike HTML, the markup symbols are unlimited and self-defining.

Because XML tags are self-defining, the tags may be used to indicate a document type definition (DTD) which is a specific definition that follows the rules of the Standard Generalized Markup Language (SGML). A DTD is a specification that accompanies a digital content item and identifies how a particular digital content item is to be processed. By indicating a DTD with a digital content item, a browser or other device that includes a DTD "reader" will be able to process the digital content item and display or print it as intended.

Returning now to FIG. 1, computer 120 includes a user interface 122. In the illustrative example, user interface 122 has the capability to display text formatted with colors and style, color graphics, color video, and to produce audio sounds. While computer 120 has a versatile user interface; it may not be readily portable. Therefore, a user often relies on other communication devices, especially when traveling or commuting. For example, a user may utilize personal digital assistant 130, which may be any device that can communicate wirelessly such as a personal digital assistant commercially available from Palm Inc., Santa Clara, Calif. As shown, personal digital assistant 130 may communicate over a wireless Mobitex network; however, personal digital assistant 130 may communicate over any wireless network. Mobitex is a wireless network architecture that specifies a framework for fixed equipment to support wireless terminals in a packet-switched, radio-based communication system. Three major components of a Mobitex network are a radio base station, a switch, and a network management center (each not shown).

Personal digital assistant 130 includes a user interface 132. While various user interfaces are commercially available for a personal digital assistant, for illustrative purposes, user interface 132 has a limited output capacity, such as, for example, the capability to display one-hundred characters of text and to display grayscale graphics.

A user may also utilize wireless telephone 140, which may be any device that can communicate wirelessly such as a wireless telephone commercially available from Cingular Wireless, Atlanta, Ga. As shown, wireless telephone 140 may communicate over a wireless Mobitex network.

Wireless telephone 140 includes a user interface 142. While various user interfaces are commercially available for wireless telephones, for illustrative purposes, user interface 142 has a limited output capacity, such as, for example, the capability to display twenty characters of text and to produce audio sounds from audio signals.

A user may utilize any of user communication devices 120, 130, 140 to access application server 110. Application server 110 includes application 112. Application 112 may cause text, graphics, and audio digital content items to be sent to one or more user communication devices 120, 130, 140. Each communication device, however, may have a different output capability. For example, each of devices 120, 130, and 140 may have only one or more of the following output capabilities: a capability to display plain text; a capability to display text with style applied; a capability to display grayscale graphic images; a capability to display color graphic images; a capability to display video images; and a capability to produce audio sounds. Therefore, a particular communication device may not be able to display a particular digital content item. For example, wireless telephone 140 may not have the output capability to display a graphic.

To overcome this problem, application 112 may also send indications signifying whether the digital content item is text, graphic, or audio, as described in more detail below. With such indications, device coordination engine 165 may identify a communication device having sufficient output capabilities to appropriately output the digital content item.

In addition to there being different types of digital content items, each digital content item may be stored and transmitted in a variety of formats. For example, a graphic may be in a Joint Photographic Experts Group (JPEG) format, a bitmap format, a grayscale graphic format, and the like. A JPEG file is a graphic image file created by choosing from a plurality of compression algorithms. JPEG is one of the graphic file formats supported on the World Wide Web, usually with the file suffix of ".jpg". Also, audio may be in MPEG-1 Audio Layer-3 (MP3) format, wave format, and the like. MP3 is a standard technology and format for compressing a sound sequence into a file while preserving the original level of sound quality when it is played. MP3 files are identified with the file name suffix of ".mp3." A particular communication device 120, 130, 140 may not be able to process a particular format. To overcome this problem, application 112 may also send indications signifying the format of the digital content item. Device coordination engine 165 may use this format indication to further refine the communication devices that capable of properly outputting the digital content item.

To get a digital content item to an appropriate communication device, rather than sending the digital content item directly to a communication device, application server 110 sends the digital content item to communication coordination system 160. Communication coordination device 160 selects which of several communication devices to the send the digital content item to and forwards the digital content item to the selected communication device. Application server 110 may communicate with communication coordination system 160 via the Internet 150, as shown. Alternatively, application server 110 may communicate with communication coordination system 160 over a LAN, a WAN, and the like.

Communication coordination system 160 comprises a device coordination engine 165 and a device manager 167, 168, 169 for each user communication device 120, 130, 140. Device managers 167, 168, 169 communicate with the communication devices 120, 130, and 140 and may also determine the operational status and the output capabilities of the communication devices. Device coordination engine 165 may use the operational status and output capabilities determined by the device managers 167, 168, and 169 in combination with digital content item type and format information received from application server 110 to select a communication device to send a particular digital content item, as described in more detail below.

Device manager 167 communicates with computer 120 via the Internet 150; however, device manager 167 may communicate with computer 120 via a LAN, WAN, intranet, and the like. Device manager 167 also communicates with device coordination engine 165, which in turn communicates with application 112.

Device manager 168 communicates with personal digital assistant 130 via Mobitex network 155; however, device manager 168 may communicate with personal digital assistant 130 via other wireless networks. Device manager 168 also communicates with device coordination engine 165, which in turn communicates with application 112.

Device manager 169 communicates with wireless telephone 140 via Mobitex network 155; however, device manager 169 may communicate with wireless telephone 140 via other wireless networks. Device manager 169 also communicates with device coordination engine 165, which in turn communicates with application 112. While a separate device manager is shown for each type of user communication device 120, 130, 140, a single device manager may communicate with more than one type of communication device. For example, one device manager may communication with both personal digital assistant 130 and wireless telephone 140.

Device coordination engine 165 is interposed between user communication devices 120, 130, 140 and application 112. As such, device coordination engine 165 may establish a session with application 112 and provide the user the capability to switch between communication devices 120, 130, 140 without having to end an existing session. That is, once a session is established between application 112 and device coordination engine 165, device coordination engine 165 maintains the session and can dynamically redirect digital content items to an appropriate communication device 120, 130, or 140, as described in more detail below. Device coordination engine 165 further provides the capability to direct one type of digital content item to a first user communication device and a second type of digital content item to a second user communication device, as described in more detail below.

Figure 2:
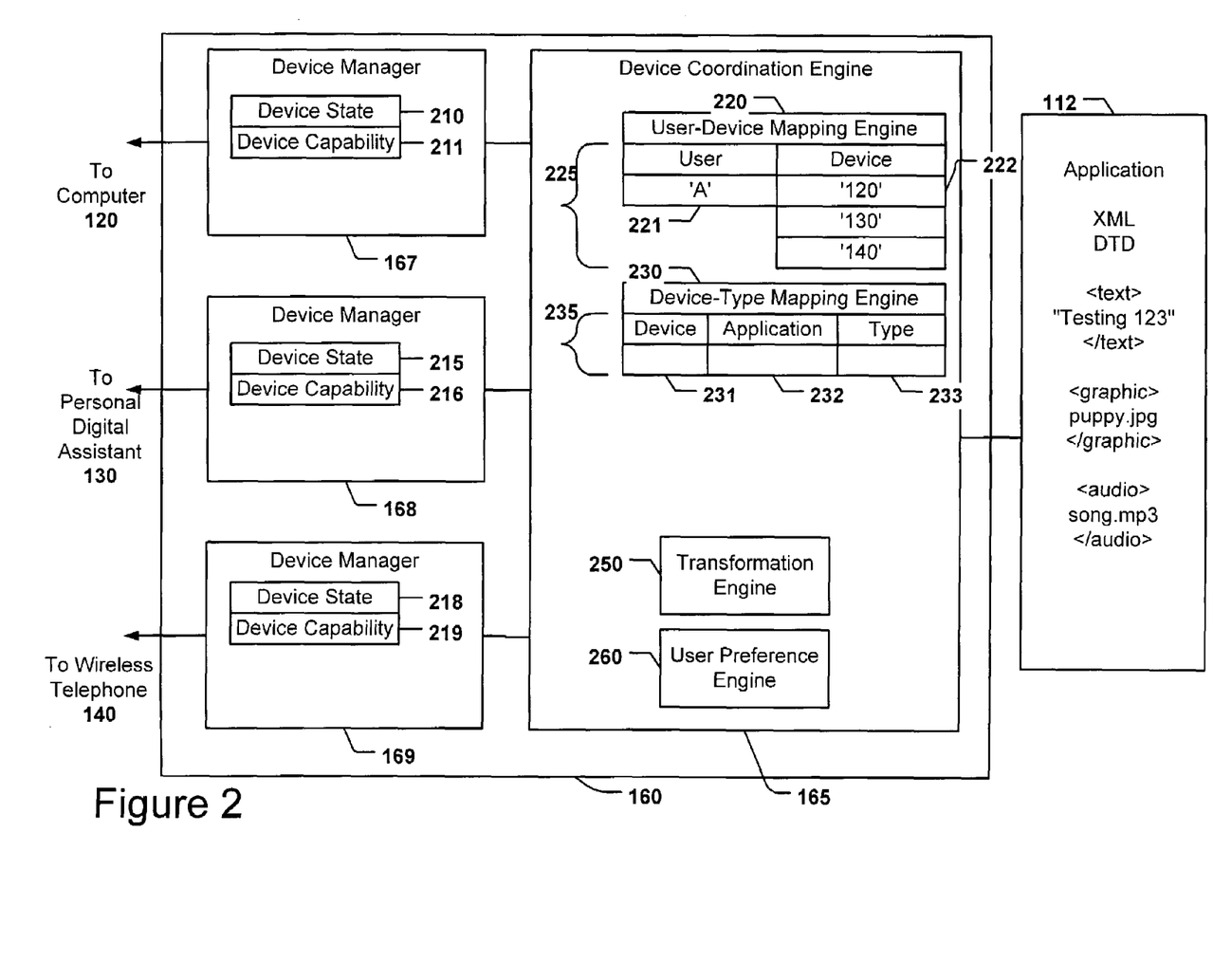
FIG. 2 is a diagram of an illustrative system for coordination of device communication.

As shown in FIG. 2, device coordination engine 165 includes a user-device mapping engine 220 that logically maps between a user and a user's communication devices and a device-type mapping engine 230 that map between a user's communication devices and the types and formats of digital content items destined for the user. Device coordination engine 165 communicates with a device manager 167, 168, 169 for each communication device. Mapping engines 220, 230 may execute on a first server and device managers 167, 168, 169 may execute on servers associated with the communication networks of their corresponding communication devices (e.g., the Mobitex network 155). Alternatively, mapping engines 220, 230 and device managers 167, 168, 169 may execute on a single server, may be distributed among several servers, and the like.

User-device mapping engine 220 provides a logical mapping between a user and a plurality of communication devices that may be accessible by a particular user. For example, user "A" may utilize three communication devices: computer 120, personal digital assistant 130, and wireless telephone 140. Table 225 may be used to implement such mapping. For example, table 225 may store a user identification in field 221 and a communication device identification in each of fields 222. For example, user "A" is mapped to computer 120, personal digital assistant 130, and wireless telephone 140 as indicated by field 221 storing 'A' and fields 222 storing '120,' 130,' and '140'. While a table is illustrated for such mapping, any mapping technique may be utilized, such as, for example, a database, a relational database, a spreadsheet, and the like. Further, the communication device may be identified by an Internet Protocol (IP) address, a unique device identifier, and the like.

Device-type mapping engine 230 logically maps between digital content item types and formats and communication devices of a user. Table 235 may be used to implement such mapping. For example, table 235 may store a device identification in field 231, an application identification in field 232, and a digital content item type and format in field 233. While a table is illustrated for such mapping, any mapping technique may be utilized, such as, for example, a database, a relational database, a spreadsheet, and the like. With such mapping, device coordination engine 165 can receive digital content items from application 112 and send the digital content items to an appropriate user communication device, as described in more detail below.

In the illustrative example shown in FIG. 2, application 112 sends various types of digital content items including text, graphics, and audio. For purposes of illustration, an illustrative text includes a text string of "Testing 123," an illustrative graphic includes a graphic file named "puppy.jpg," and an illustrative audio includes an audio file named "song.mp3."

In addition to sending the illustrative digital content items, application 112 may also send a corresponding indication of the type of digital content item. One technique for such indications may be implemented using XML and DTD. For example, application 112 may send text digital content item "Testing 123" and may also send corresponding XML tags <text> and </text>. Application 112 may send graphic file "puppy.jpg" and may also send corresponding XML tags <graphic> and </graphic>. Application 112 may send audio file "song.mp3" and may also send corresponding XML tags <audio> and </audio>. With such tags, device-type mapping engine 225 may determine a digital content item type by reading the tags. Alternatively, device coordination engine 165 may determine the digital content item type based on the digital content item itself. For example, if a file includes an extension of ".jpg," device coordination engine 165 may determine that the type of digital content item is graphic.

Application 112 may further include tags that indicate the format of the digital content item. For example, a tag <jpeg> may be used to indicate a JPEG formatted file. Alternatively, device coordination engine 165 may determine the digital content item format based on the digital content item itself. For example, if a file includes an extension of ".jpg," device coordination engine 165 may determine that the digital content item is a JPEG formatted file.

Device coordination engine 165 may also determine the output capability (i.e., the capability of a device to display or sound digital content items) of each communication device to assist in mapping between a digital content item type and a communication device. The device status may indicate that the communication device is on, off, capable of receiving a digital content item, communicating with another application, and the like. The device capability may indicate that the communication device is capable of displaying or sounding a particular type of digital content item. For example, the device capability may indicate that the communication device is capable of displaying color graphics, text, and the like. The device capability may further indicate that the communication device is capable of displaying or sounding a particular formatted digital content item. For example, the device capability may indicate that the communication device is capable of displaying a grayscale graphic, a JPEG file, and the like.

Typically, device coordination engine 165 requests the device status and the device output capability from device managers 167, 168, and 169. The device managers may request the device status and device output capability from their respective device or may receive a broadcast from the device.

Each device manager 167, 168, and 169 includes a memory location, such as, for example, a field to store a device status and a field to store a device capability. Device manager 167 includes a field 210 to store an indication of the status of computer 120 and a field 211 to store an indication of the capability of computer 120. For example, field 210 may store an indication that computer 120 is on and is capable of communicating and field 211 may store an indication that user interface 122 of computer 120 is capable of displaying text with color and style, color graphics, color video and is capable of producing audio sounds. The status and capability of computer 120 may be requested and received by device manager 167, may be broadcast by computer 120, may be predefined and stored, and the like.

Device manager 168 includes a field 215 to store an indication of the status of personal digital assistant 130 and a field 216 to store an indication of the capability of personal digital assistant 130. For example, field 215 may store an indication that personal digital assistant 130 is on and is capable of communicating and field 216 may store an indication that user interface 132 of personal digital assistant 130 is capable of displaying text and grayscale graphics.

Device manager 169 includes a field 218 to store an indication of the status of wireless telephone 140 and a field 219 to store an indication of the capability of wireless telephone 140. For example, field 218 may store an indication that wireless telephone 140 is on and is capable of communicating and field 219 may store an indication that user interface 142 of wireless telephone 140 is capable of producing audio sounds. With such fields, device coordination engine 165 may determine the status and capability of each communication device corresponding to a particular user by requesting such status and output capability from device manager 167, 168, 169.

With the status and output capability of each communication device and with the indication of the type of digital content item from application 112, device-type mapping engine 230 may map between digital content item types and communication devices. To implement such mapping, device-type mapping engine 230 may include a table 235 for storing logical mappings between digital content item types and communication devices. Table 235 includes a field 231 to store an indication of a communication device, a field 232 to store an indication of a corresponding application, and a field 233 to store an indication of the type of digital content item that is to be mapped to the communication device (i.e., stored in field 231). While a table is illustrated for such mapping, any mapping technique may be utilized, such as, for example, a database, a relational database, a spreadsheet, and the like.

To determine the mapping between digital content item type and communication device, device-type mapping engine 230 may use device status, device output capability, as well as other information, such as for example, information from user preference engine 260, described in more detail below.

Figure 3:
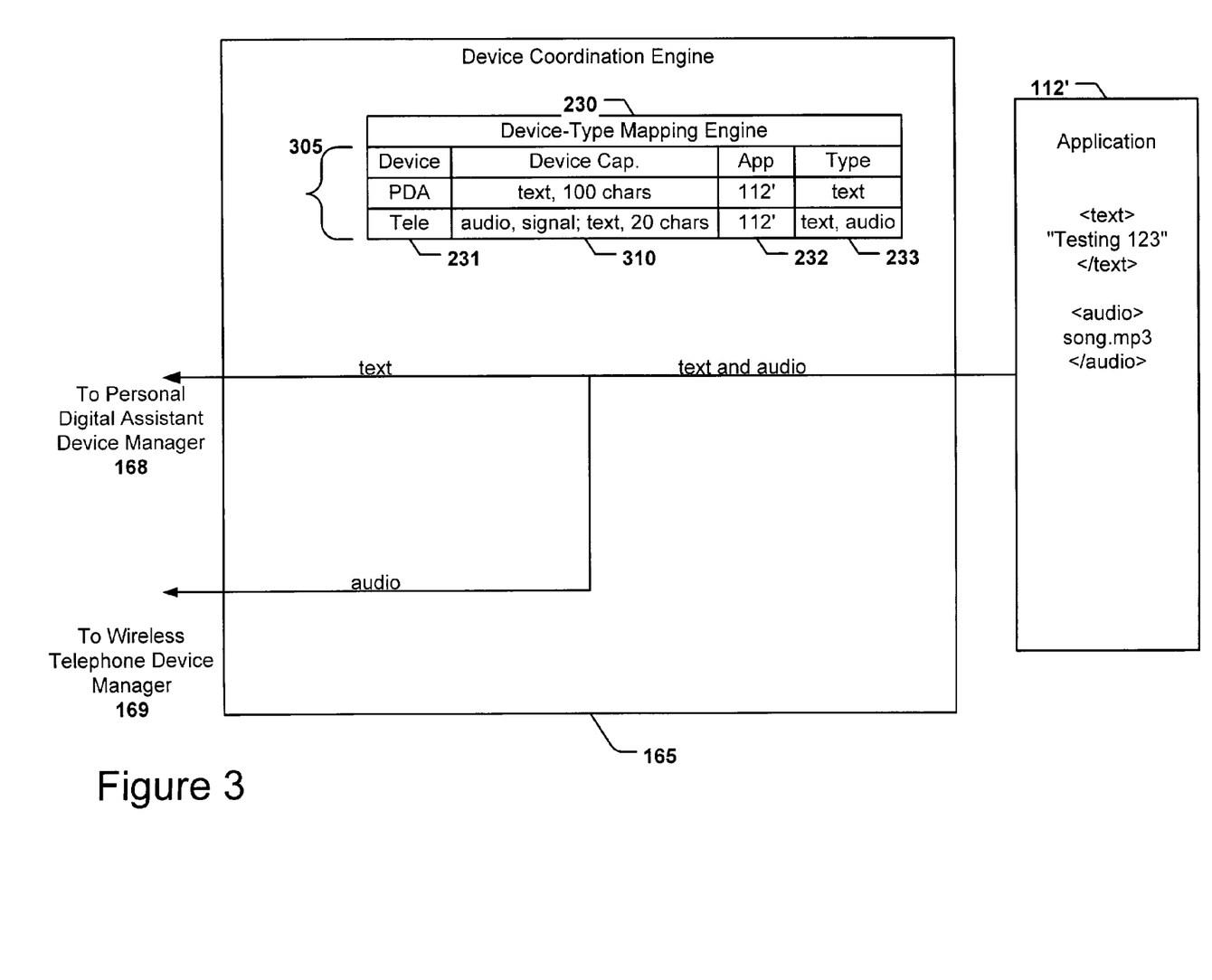
FIG. 3 is a diagram depicting details of the illustrative system for coordination of device communication of FIG. 2.
Figure 4:
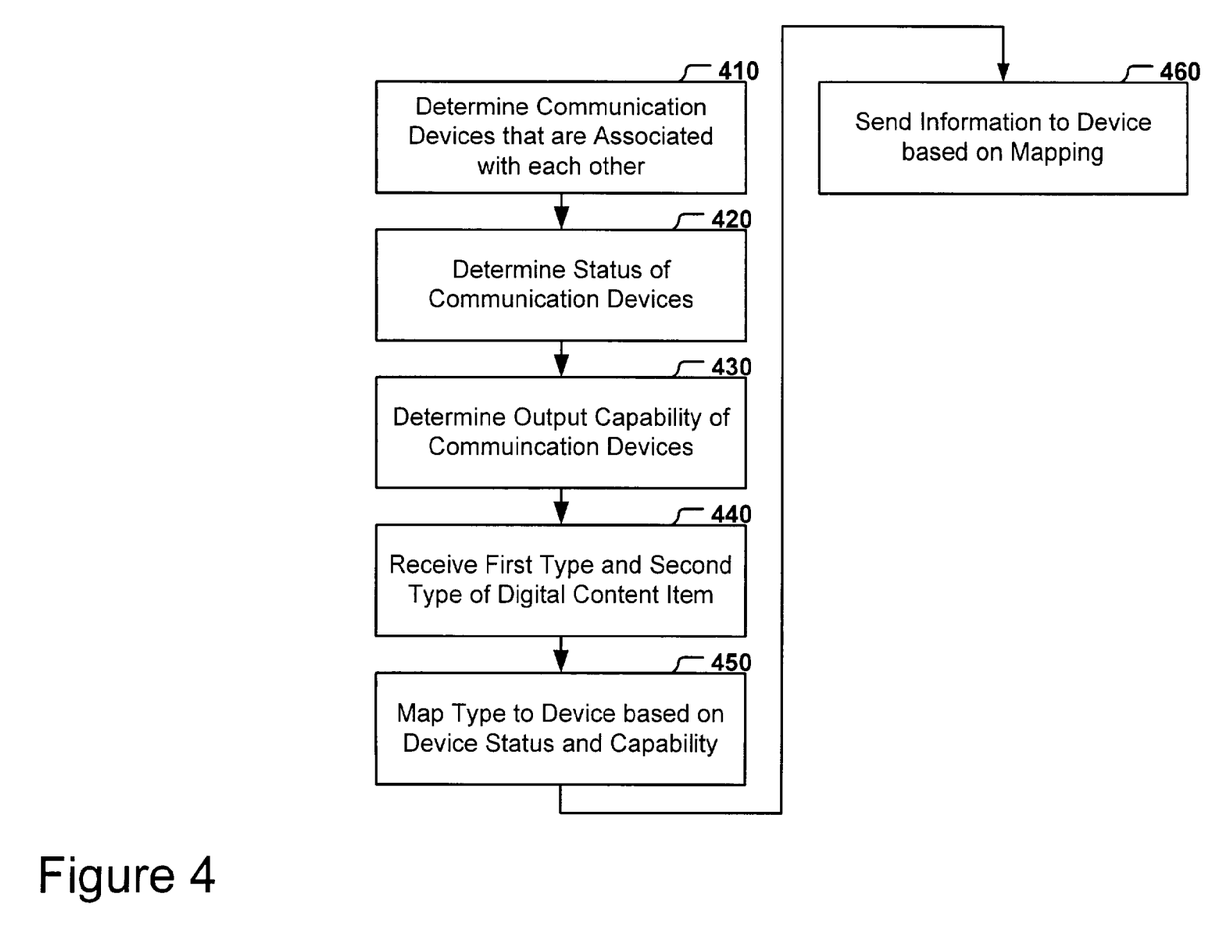
FIG. 4 is a flow diagram of an illustrative method for coordination of device communication.

FIG. 3 illustrates further details of device-type mapping engine 230 and of determining a logical mapping between communications devices and digital content items. The determined mapping is stored in illustrative table 305. FIG. 4 shows illustrative method steps of device coordination engine 165 and device-type mapping engine 230. In the illustrative example of FIGS. 3 and 4, application 112' sends a single communication during a communication session comprising text and audio digital content items to device coordination engine 165. Application 112' sends an indication of digital content item type. In particular, application 112' sends XML tag <text>, text digital content item "Testing 123", and XML tag, </text>. Application 112' also sends XML tag <audio>, audio file "song.mp3", and XML tag </audio>. Also, in this example, computer 120 is not available and has a device status of "off".

At step 410, device coordination engine 165 determines communication devices that are associated with each other or associated with each other by a particular user. For example, at device coordination engine 165 may determine that computer 120, personal digital assistant 130, and wireless telephone 140 are associated with user 'A,' for example, by reading table 225. Table 225 may have been created by user-device mapping engine 220, prior to step 410.

At step 420, device-type mapping engine 230 determines the statuses of the communication devices determined to be associated with each other at step 410. For example, device-type mapping engine 230 may determine that computer 120 has a status of "off", personal digital assistant 130 has a status of "on", and wireless telephone 140 has a status of "on", for example, by requesting such status information from device managers 167, 168, and 169.

At step 430, device-type mapping engine 230 determines the output capabilities of the communication devices determined to be associated with each other at step 410. For example, device-type mapping engine 230 may determine that personal digital assistant 130 has a capability to display one-hundred characters of text. Device-type mapping engine 230 further determines that wireless telephone 140 has a capability to display twenty characters of text and to produce audio sounds from an audio signal. Device-type mapping engine 230 may determine the capability information, for example, by requesting such capability information from device managers 168 and 169.

At step 440, device coordination engine 165 receives digital content items from application 112'. In this example, device coordination engine 165 receives XML tag <text>, text digital content item "Testing 123," and XML tag </text>. Device coordination engine 165 further receives XML tag <audio>, audio file "song.mp3," and XML tag </audio>. Device coordination engine 165 determines that "Testing 123" is a text type digital content item and that audio file "song.mp3" is an audio type digital content item by reading the associated XML tags.

At step 450, device-type mapping engine 230 maps the digital content items to a communication device based on the status and output capability of the communication devices. For example, device-type mapping engine 230 may map audio file "song.mp3" to wireless telephone 140 because it is the only available device (i.e., a device having a status of "on") that has the output capability to produce audio sounds. Device-type mapping engine 230 may invoke transformation engine 250 to convert the MP3 file to audio signals capable of being transmitted to wireless telephone 140. That is, in addition to mapping based on digital content item type, device-type mapping engine 230 may map based on the format of the digital content item. For example, device-type mapping engine 230 may determine from field 310 that wireless telephone 140 is capable of producing audio sounds from an audio signal, but is not capable of producing audio sounds from an MP3 formatted file. Device-type mapping engine 230 may further determine (e.g., from the file extension of "song.mp3") that file "song.mp3" is a MP3 formatted file. Therefore, device-type mapping engine 230 may cause transformation engine 250 to convert the MP3 file to an audio signal and send the audio signal to the wireless telephone device manager 169.

Also at step 450, device-type mapping engine 230 may determine that "Testing 123" is a text type digital content item and that both personal digital assistant 130 and wireless telephone 140 are capable of displaying text. Device-type mapping engine 230 may therefore map the text to either personal digital assistant 130 or to wireless telephone 140 because both have the capability to display text. To determine where to map the text, device-type mapping engine 230 may request information from user preference engine 260 to determine a user preference, as described in more detail below.

Device-type mapping engine 230 may create table 305 at step 450 to assist in mapping from communication devices to digital content items types. Alternatively, device-type mapping engine 230 may create table 305 prior to step 450 and may reference table 305 at step 450. As shown, table 305 is similar to table 235 and further includes a field 310 for storing an indication of device capability. Table 305 stores a record for personal digital assistant 130 that indicates in field 231 that the device is personal digital assistant 130, indicates in field 310 that the device is capable of displaying one-hundred characters of text, indicates in field 232 that the corresponding application is application 112', and indicates in field 233 that the device can display text. Table 305 stores a record for wireless telephone 140 that indicates in field 231 that the device is wireless telephone 140, indicates in field 310 that the device is capable of displaying twenty characters of text and producing audio sounds from an audio signal, indicates in field 232 that the corresponding application is application 112', and indicates in field 233 that the device can display text and sound audio.

In the process of such mapping at step 450, device-type mapping engine 230 may analyze the capabilities of each communication device and select a device based on the analyzed capabilities (e.g., may select the communication device with the best output capabilities for outputting the digital content item). For example, device-type mapping engine 230 may determine that wireless telephone 140 is only capable of displaying twenty characters at a time while personal digital assistant 130 is capable of displaying one-hundred characters at a time. With such output capability information, device-type mapping engine 230 may select the communication device with the higher capability (i.e., personal digital assistant 130).

At step 460, device coordination engine 165 sends the text to personal digital assistant device manager 168 and the audio signal to wireless telephone device manager 169 based on the mapping of device-type mapping engine 230 at step 450.

Figure 5:
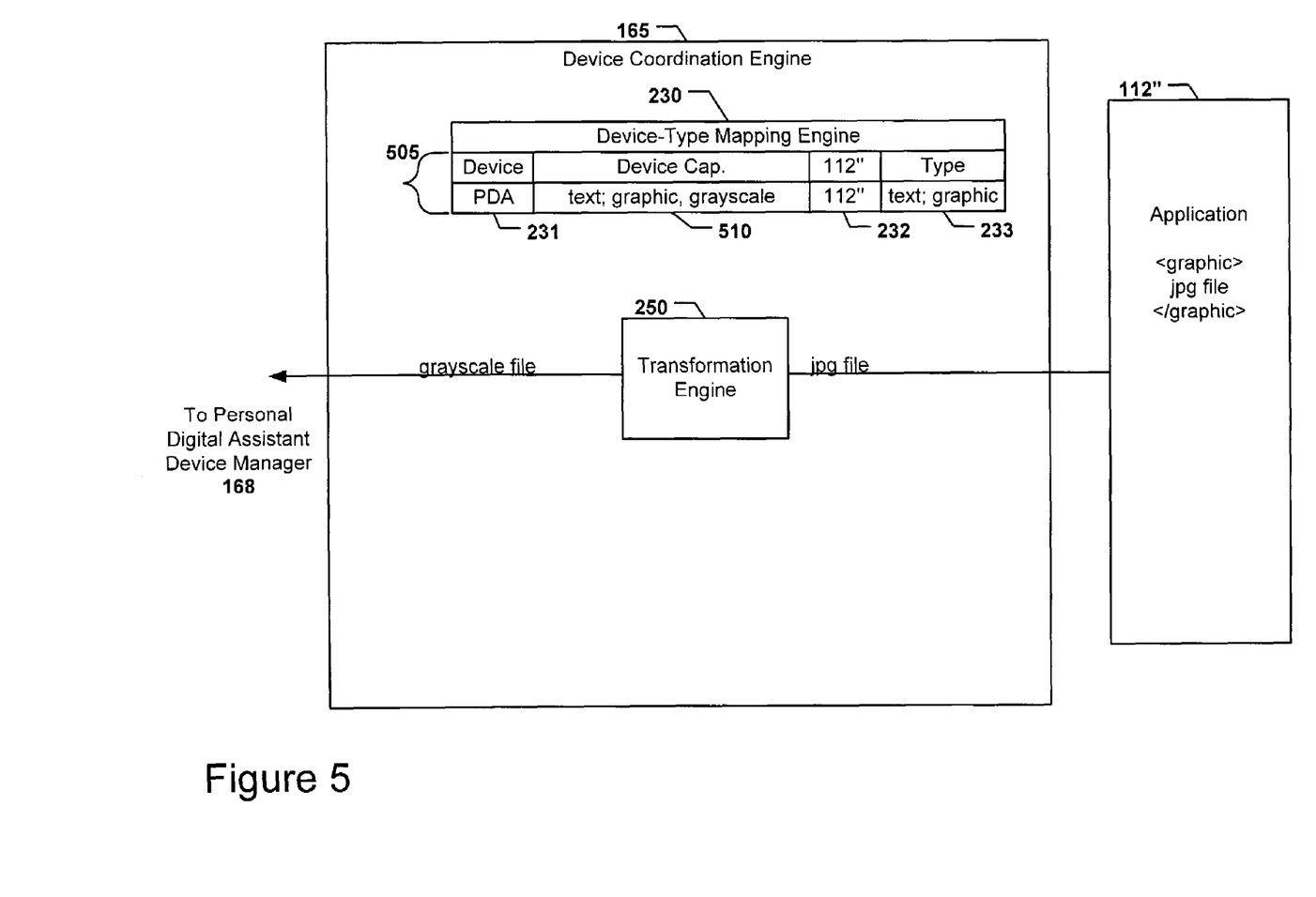
FIG. 5 is a diagram of depicting further details of the illustrative system for coordination of device communication of FIG. 2.
Figure 6:
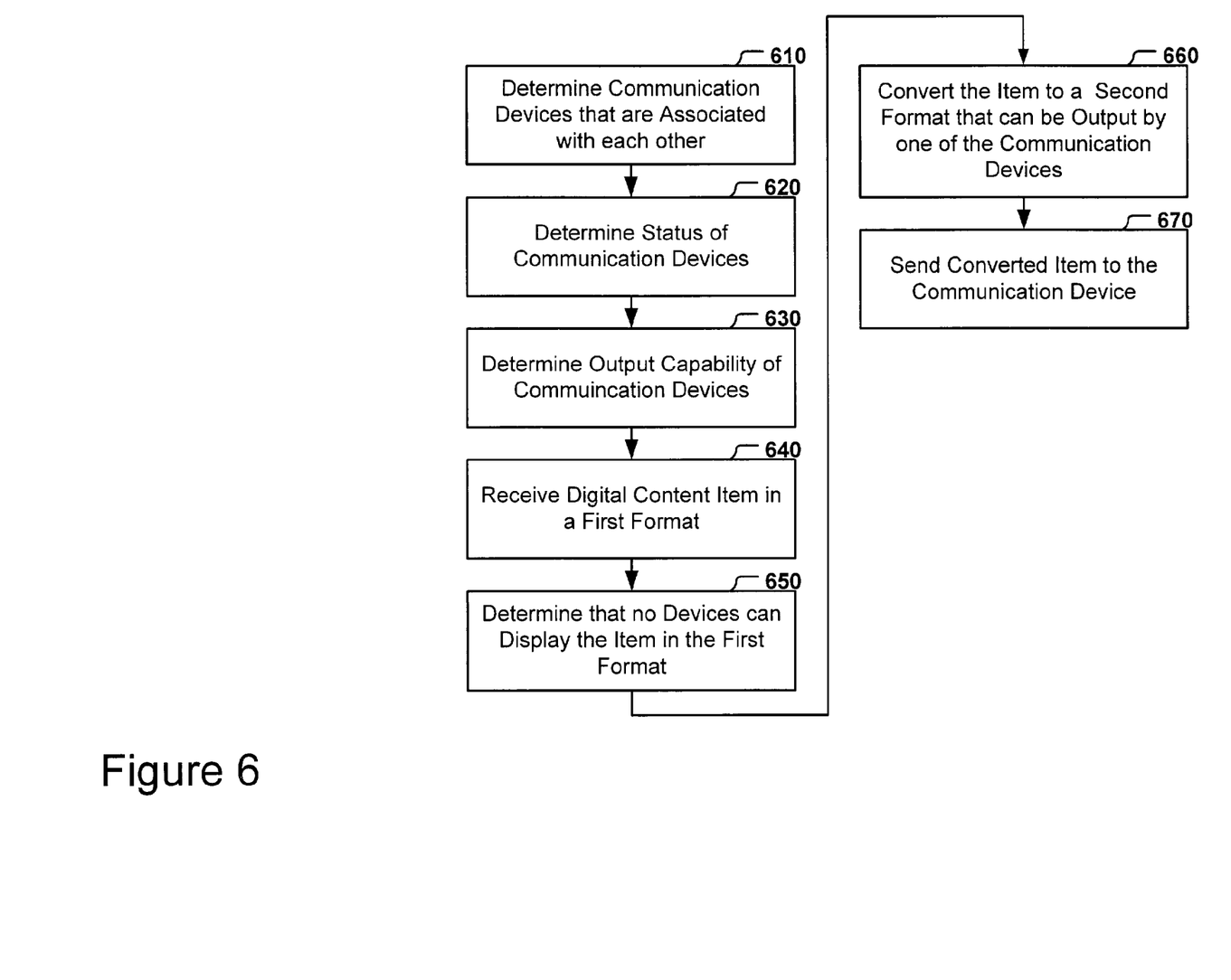
FIG. 6 is a flow diagram of an another illustrative method for coordination of device communication.

The situation may arise when there is no device available with the capability to properly display the digital content item. FIGS. 5 and 6 illustrate system and methods for handling such a situation. In an illustrative example, it is assumed that the only communication device available is personal digital assistant 130 and that application 112" sends XML tag <graphic>, graphic file "puppy.jpg," and XML tag </graphic>.

Referring to FIG. 6, at step 610, device coordination engine 165 determines communication devices that are associated with each other or associated with each other by a particular user. For example, device coordination engine 165 may determine that computer 120, personal digital assistant 130, and wireless telephone 140 are associated with user 'A,' for example, by reading table 225.

At step 620, device-type mapping engine 230 determines the statuses of the communication devices determined to be associated with each other at step 610. For example, device-type mapping engine 230 may determine that computer 120 has a status of "off," personal digital assistant 130 has a status of "on," and wireless telephone 140 has a status of "off," for example, by requesting such status information from device managers 167, 168, and 169.

At step 630, device-type mapping engine 230 determines the output capabilities of the communication devices determined to be associated with each other at step 610. For example, device-type mapping engine 230 may determine that personal digital assistant 130 has a capability to display text and grayscale graphics, for example, by requesting such capability information from device manager 168.

At step 640, device coordination engine 165 receives a digital content item from application 112" in a first format. In this example, device coordination engine 165 receives XML tag <graphic>, graphic file "puppy.jpg" and XML tag </graphic>. Device coordination engine 165 determines that file "puppy.jpg" is a graphic type digital content item by reading the associated XML tags and determines that the file is formatted in JPEG format. Device coordination engine 165 may determine that the file is a JPEG file by reading the file extension or alternatively, application 112" may include such information in the XML tags.

At step 650, device-type mapping engine 230 determines that no available communication device has the capability to display the digital content item in the first format. For example, device-type mapping engine 230 may determine that no available communication device has the capability to display a JPEG file. Device-type mapping engine 230 may make such determination by reading table 505 which may be created prior to step 650 or during step 650. As shown, table 505 is similar to table 235 and further includes a field 510 for storing an indication of device capability. Table 505 stores a record for personal digital assistant 130 that indicates in field 231 that the device is personal digital assistant 130, indicates in field 510 that the device is capable of displaying text and displaying grayscale graphics (rather that JPEG graphics), indicates in field 232 that the corresponding application is application 112", and indicates in field 233 that the device can display text and graphics.

At step 660, device-type mapping engine 230 determines that a communication device can display a different format of the same type of digital content item received at step 640 and causes conversion of the digital content item to that different format. For example, device-type mapping engine 230 may determine that personal digital assistant 130 can display grayscale graphics and call transformation engine 250 to convert the JPEG file to a grayscale file. Transformation engine 250 may also perform other conversions, such as, for example, converting an HTML file to a web clipped HTML file, converting an HTML file to a Dynamic Hypertext Markup Language DHTML file, converting an HTML file to an Extensible Hypertext Markup Language (XHTML) file, and the like.

At step 670, device coordination engine 165 sends the converted file (i.e., the grayscale file) to the communication device determined at step 660 (e.g., personal digital assistant device manager 168).

Figure 7:
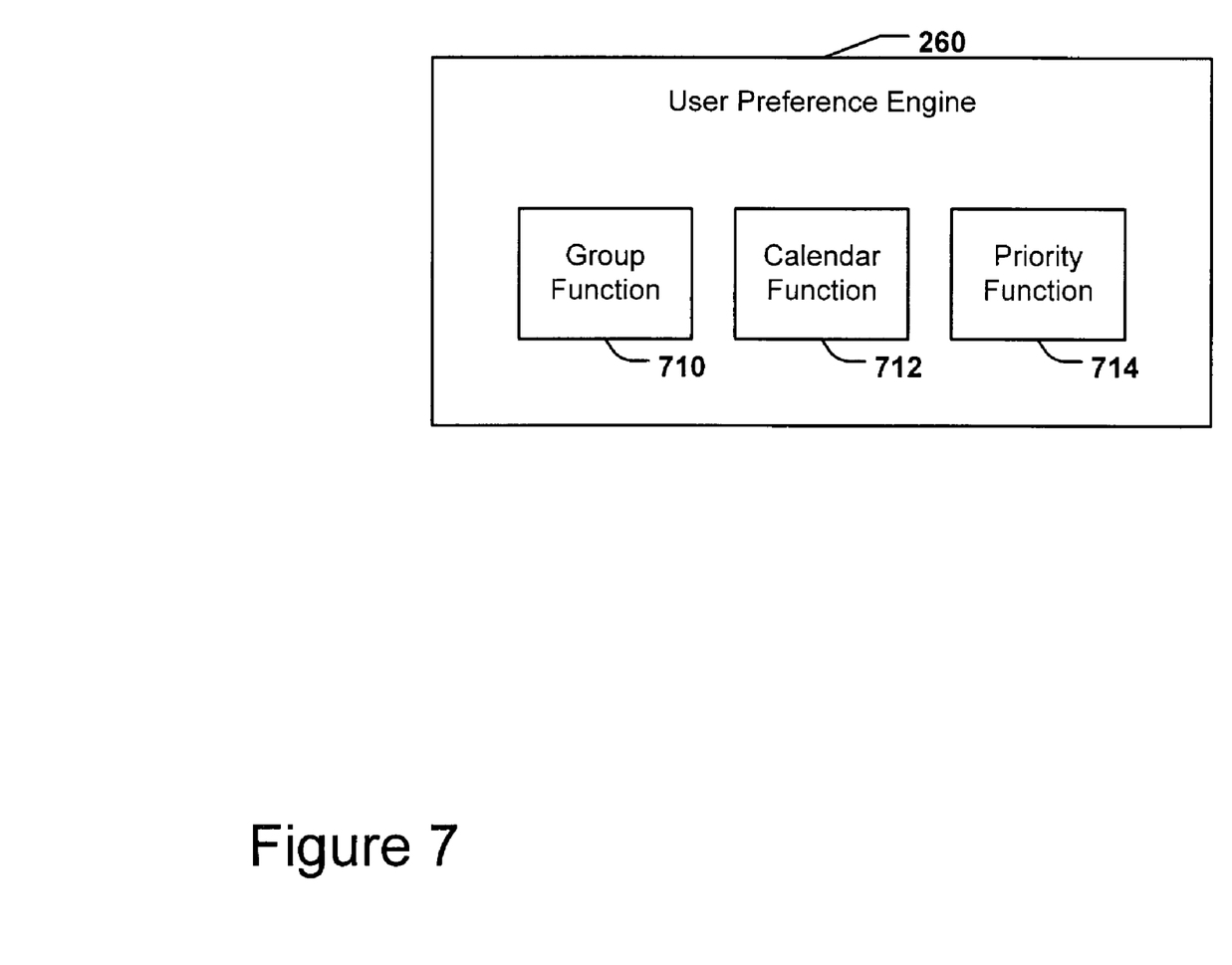
FIG. 7 is a diagram depicting yet further details of the illustrative system for coordination of device communication of FIG. 2.

As described above, there are scenarios in which several communication devices may be available for communication and may be capable of properly displaying the digital content item. In these scenarios, device-type mapping engine 220 may communicate with user preference engine 260 to determine which communication device to send the digital content item. As shown in FIG. 7, user preference engine 260 includes a group function 710, a calendar function 712, and a priority function 714.

Group function 710 associates user communication devices into a group. For example, a user may select to group devices into three groups: a "home" group of devices that the user utilizes at home, a "work" group of devices that the user utilizes at work, and a group of devices that the user utilizes at all times. With such grouping, digital content items may be sent concurrently to one or more than one communication device.

Calendar function 712 associates a time period with a user communication device or a user communication device group. For example, a work computer (or devices in a work group) may be associated with weekdays between 7:00 AM and 6:00 PM. Also, a home computer (or devices in a home group) may be associated with weekdays between 6:00 PM and 10:00 PM and weekends between 8:00 AM and 10:00 PM. Further, a pager (or the devices in the group that are used at all times) may be associated with all time periods. With calendar function 712, communication coordination system 160 determines the communication device associated with the current time and may send the digital content item to that communication device.

Priority function 714 associates priority levels with a user communication device or a user communication device group. For example, a personal digital assistant may be assigned a higher priority than a wireless e-mail device because the user interface may be easier to use or because it may cost less to receive digital content items. With such priority levels, communication coordination system 160 determines the highest priority available communication device and may send a digital content item to that communication device.

In addition to the user preference functions, a user may request that digital content items be sent to a particular communication device. For example, upon arriving at work, a user may send a request to communication coordination system 160 to send all digital content items to computer 120. Upon receiving this request, communication coordination system 160 may update priority data, logical mapping tables, and the like. In this manner, a user may dynamically transfer from using a first communication device to interface with an application, to using a second communication device to interface with the same application.

Also, a user may dynamically add a new communication device or dynamically add capabilities to an existing communication device. For example, a user may connect a color graphic monitor to a personal digital assistant, thereby providing increased capabilities to the personal digital assistant. The user may send a request to device manager to modify the device capability information stored in the device manager. Preferably, personal digital assistant detects the addition of increased capability and automatically updates its corresponding device manager with such increased capability information.

As can be appreciated, a system and method is provided for coordinating between communication devices. With such a system and method, a user may receive digital content item at one of a variety of communication devices that has the capability and status to properly receive and display the digital content item.

Program code (i.e., instructions) for performing the above-described methods may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the above-described processes. When implemented on a general-purpose processor, the program code combines with the processor to provide a unique apparatus that operates analogously to specific logic circuits.

It is noted that the foregoing description has been provided merely for the purpose of explanation and is not to be construed as limiting of the invention. While the invention has been described with reference to illustrative embodiments, it is understood that the words which have been used herein are words of description and illustration, rather than words of limitation. Further, although the invention has been described herein with reference to particular structure, methods, and embodiments, the invention is not intended to be limited to the particulars disclosed herein; rather, the invention extends to all structures, methods and uses that are within the scope of the appended claims. Those skilled in the art, having the benefit of the teachings of this specification, may effect numerous modifications thereto and changes may be made without departing from the scope and spirit of the invention, as defined by the appended claims.

What is claimed is:

1. A method for coordinating network communication between multiple communication devices associated with a user, comprising:
    determining that a first communication device has a first output capability regarding displaying or sounding digital content items and that a second communication device has a second output capability regarding displaying or sounding digital content items, wherein the determining is accomplished by a user-device mapping engine that logically maps between the user and the user's communication devices and a device-type mapping engine that maps between a user's communication devices and a type and format of digital content items, wherein the type of digital content items is identified by one of a set of Extensible Markup Language tags and a file extension;
    determining that the first and second communication devices are associated with each other;
    receiving, from an application, a first digital content item and a second digital content item within a communication session;
    determining by the device-type mapping engine that the first digital content item is able to be output by the first communication device and that the second digital content is able to be output by the second communication device, wherein the device-type mapping engine analyzes the capabilities of each communication device and selects a communication device with the highest capability relative to the type and format of the digital content item; and
    concurrently with sending the first digital content item to the first communication device based on the capability of the first communication device to display the first digital content item, sending the second digital content item to the second communication based on the capability of the second communication device to display the second digital content item, wherein the device-type mapping engine allows the user to switch between the first and second communication devices without having to end an existing session.

2. The method as recited in claim 1, wherein the first and second output capability comprises at least one of a capability to display plain text, a capability to display text with style applied, a capability to display grayscale graphic images, a capability to display color graphic images, a capability to display video images, and a capability to produce audio sounds.

3. The method as recited in claim 1, wherein the first and second communication devices each comprise one of a personal computer, a laptop computer, a personal digital assistant, a wireless phone, a wireless pager, a wireless text messaging device, and a wireless e-mail device.

4. The method as recited in claim 1, wherein the first communication device is a wireless phone capable of producing audio sounds, the second communication device is a wireless text messaging device, and wherein receiving the first and second digital content items comprises receiving a text digital content item and an audio digital content item, wherein the first and second digital content items are each accompanied by a document type definition complying with the Standard Generalized Markup Language;
    determining that the first digital content item is able to be output by the first communication device and that the second digital content is able to be output by the second communication device comprises determining that the wireless text messaging device can display text and that the wireless phone is capable of producing audio sounds; and
    sending the first and second digital content items comprises sending the text digital content item to the wireless text messaging device and the audio digital content item to the wireless phone.

5. The method as recited in claim 1, wherein the first communication device is a wireless phone capable of producing audio sounds, the second communication device is a wireless communication device capable of displaying graphics and wherein receiving a communication including the first and the second digital content items comprises receiving an audio digital content item and a graphic digital content item;
    determining that the first digital content item is able to be output by the first communication device and that the second digital content is able to be output by the second communication device comprises determining that the wireless phone is capable of producing audio sounds and that the wireless communication device is capable of displaying graphics; and
    sending the first and second digital content items comprises sending the audio digital content item to the wireless phone and the graphic digital content item to the personal digital assistant.

6. The method as recited in claim 1, wherein determining that the first digital content item is able to be output by the first communication device comprises determining whether the first digital content item comprises text, audio, or graphics based on an indication associated with the first digital content item.

7. The method as recited in claim 1, wherein receiving a first digital content item comprises receiving an Extensible Markup Language tag associated with the first digital content item indicating whether the first digital content item comprises text, audio, or graphics.

8. A method for coordinating network communication between multiple communication devices associated with a user, comprising:
    receiving, at a device coordination engine, a HTML message destined for a first communication device containing at least a first digital content item and a second digital content item within a communication session;
    determining each type of digital content item from an accompanying tag;
    determining a second communication device associated with the first communication device using a user-device mapping engine where the user-device mapping engine provides logical mapping between the user and the communications devices associated with each other and available to the user which is also in communication with a device coordination engine;
    determining, by the device coordination engine, a device status for each of the first and second communication devices by requesting from a first device manager associated with the first communication device and a second device manager associated with the second communication device, the device status indicating whether the first and second communication devices are operable to receive a digital content item and an indication of the output capability of the communication device;
    using the device status, mapping between the digital content item type and the multiple communication devices; and
    sending the first and second digital content items to each of the first and second communication devices based at least on the device status and the type of digital content item, wherein also the device coordination engine allows the user to receive each of the first and second digital content items by switching between the first and second communication devices without interrupting an existing communication session.

9. The method as recited in claim 8, wherein the sending comprises sending the digital content item to both the first and second communication devices based on a grouping of communication devices.

10. The method as recited in claim 8, further comprising:
    determining that the first communication device is associated with a first time period;
    determining that the second communication device is associated with a second time period;
    determining a current time upon receiving the message; and
    sending the message to the first communication device if the current time corresponds to the first time period and sending the message to the second communication device if the current time corresponds to the second time period.

11. The method as recited in claim 8, further comprising:
    determining a current time upon receiving the message; and
    sending the message to either the first communication device or the second communication device based at least on a predefined schedule.

12. The method as recited in claim 8, further comprising:
    sending the message to either the first communication device or the second communication device based at least on a predefined priority.

13. The method as recited in claim 8, further comprising:
    determining an output capability of the first and second communication device, the output capability regarding displaying or sounding digital content items; and
    sending the message to the communication device having the highest output capability.

14. The method as recited in claim 8, wherein the first communication device has a first output capability, the method further comprising:
    dynamically adding a new output capability to the first communication device; and
    communicating to the network, the addition of the new output capability.

15. The method as recited in claim 8, further comprising receiving a request to send the message to the first communication device.

16. A system for coordinating network communication between a plurality of communication devices associated with a user, comprising:
    for each of the plurality of communication devices, a device manager that is operable to determine a status and an output capability regarding display or sounding capability at least one of plurality of communication devices and to communicate with the corresponding communication device; and
    a device coordination engine in communication with an application and with each device manager, the device coordination engine being operable
        to establish a communication session with the application,
        to receive from the application a first type of digital content item and a second type of digital content item within the communication session, and
        to send the first type of digital content item to a first communication device of the plurality of communication devices and the second type of digital content item to a second communication device of the plurality of communication devices based on the status and the output capability of the first communication device and the second communication device and the first type and the second type of digital content items, wherein the device coordination engine further comprises a user preference engine which includes a group function which associates the first and the second communication devices into defined groups and which allows the device coordination engine to distribute the first and the second types of digital content items based on the output capability of each of communication devices in the defined group, a calendar function which allows the distribution of the first and the second types of digital content items to the first and the second communication devices based on a stipulated time period associated with each of the first and the second communication devices, and a priority function which associates a priority level to the first and the second communication devices which allows the distribution of the first and the second types of digital content items to the first and the second communications devices based on availability of the first and the second communication device and its priority level;
    wherein the device coordination engine allows the user to switch between the first and second communication devices without having to end an existing session.

17. A system for coordinating network communication between a plurality of communication devices associated with a user, comprising:

for each of the plurality of communication devices a device manager that is operable to determine an output capability of the communication device, the output capability regarding displaying or sounding digital content items, and operable to communicate with the corresponding communication device; and a device coordination engine that is operable to communicate with an application and that is operable to communicate with each device manager, to determine that a first communication device of the plurality of communication devices has a first output capability and that a second communication device of the plurality of communication devices has a second output capability, to determine that the first and the second communication devices are associated with each other, to receive a communication from an application including a first digital content item and a second digital content item within a communication session, to determine that the first digital content item is able to be output by the first communication device and that the second digital content is able to be output by the second communication device, and to send the first digital content item to the first communication device and send the second digital content item to the second communication device wherein further, the device coordination engine comprises a group function that associates the communications devices into defined groups which allows the user to receive each of the first and second digital content items by switching between the first and second communication devices without interrupting an existing communication session.

18. The system as recited in claim 17, wherein the first and second output capability comprises at least one of a capability to display plain text, a capability to display text with style applied, a capability to display grayscale graphic images, a capability to display color graphic images, a capability to display video images, and a capability to produce audio sounds.

19. The system as recited in claim 17, wherein the first and second communication devices each comprise one of a personal computer, a laptop computer, a personal digital assistant, a wireless phone, a wireless pager, a wireless text messaging device, and a wireless e-mail device.

20. The system as recited in claim 17, wherein the device coordination engine is further operable to determine whether the first digital content item comprises text, audio, or graphics based on an indication associated with the first digital content item.

21. The system as recited in claim 17, wherein the device coordination engine is further operable to receive an Extensible Markup Language tag associated with the first digital content item indicating whether the first digital content item comprises text, audio, or graphics.

\* \* \* \* \*